Nov. 25, 1941. A. E. BIERMANN 2,263,561
VARIABLE COMPRESSION-RATIO BARREL-TYPE ENGINE
Filed Aug. 7, 1940 3 Sheets-Sheet 1

INVENTOR
ARNOLD E. BIERMANN
BY
ATTORNEY

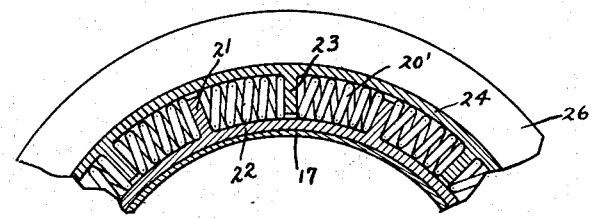
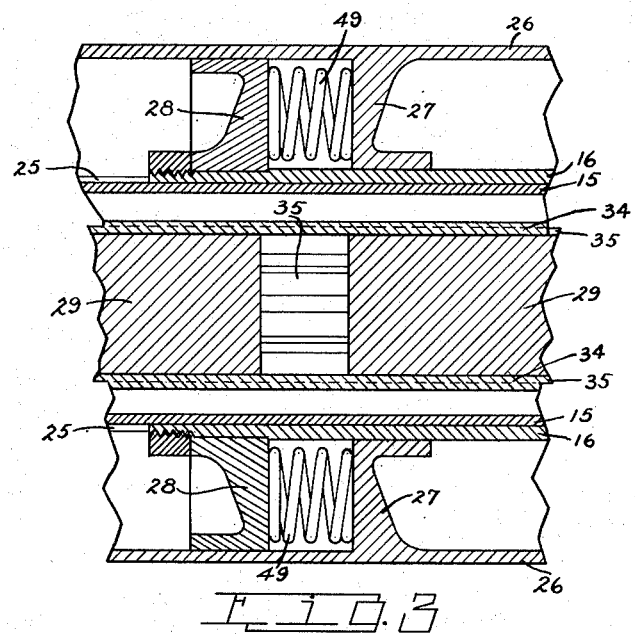

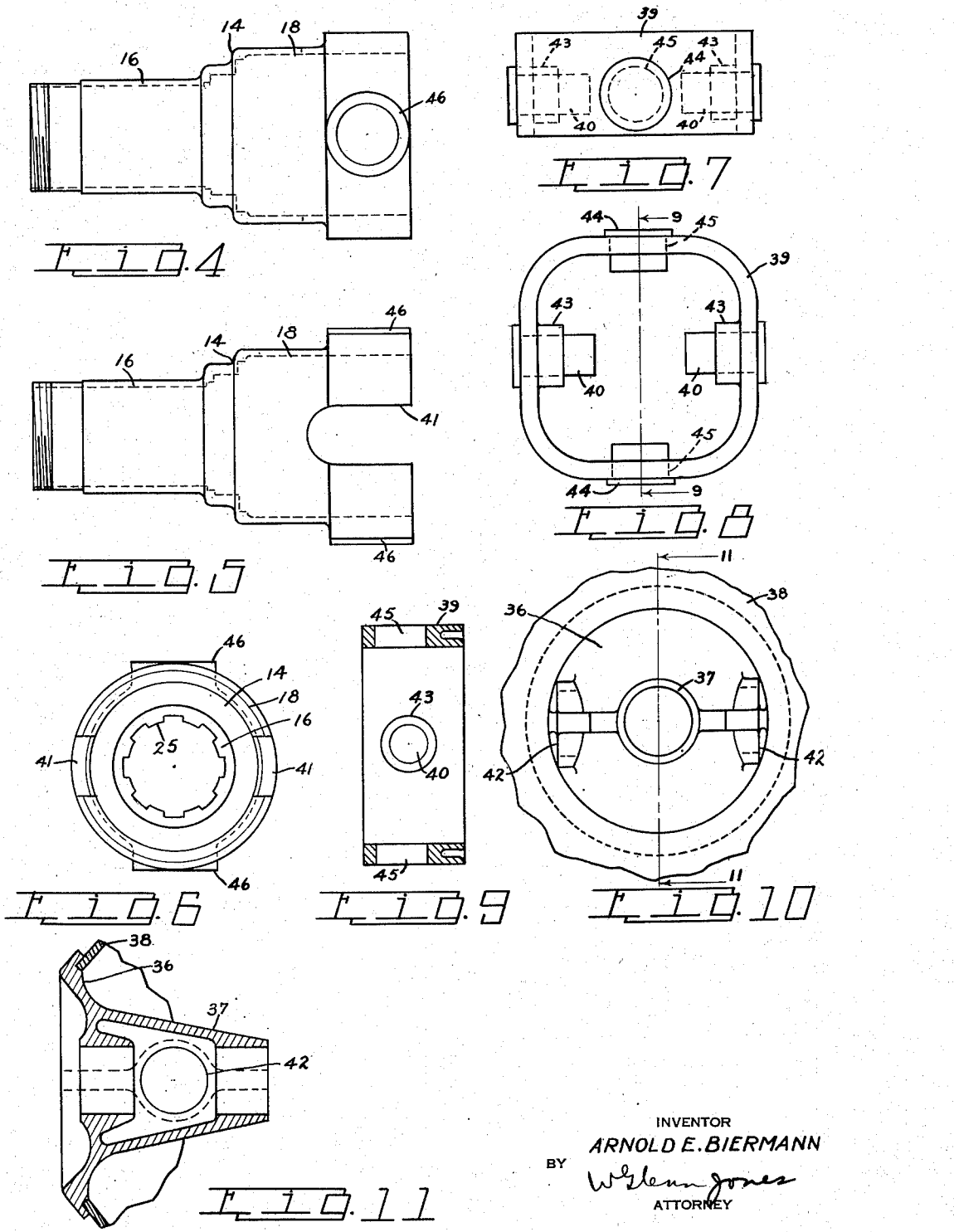

Patented Nov. 25, 1941

2,263,561

UNITED STATES PATENT OFFICE 2,263,561

VARIABLE COMPRESSION RATIO BARREL-TYPE ENGINE

Arnold E. Biermann, Hampton, Va.

Application August 7, 1940, Serial No. 351,701

11 Claims. (Cl. 74—60)

(Granted under the act of March 3, 1883, as amended April 30, 1928; 370 O. G. 757)

This invention relates to internal combustion engines of the type having the cylinders parallel to the power shaft. This form of engine is particularly adaptable in aircraft use as it has definite advantages over other types with respect to compactness, low frontal area, well-balanced parts, and its possibilities for high thermal efficiency. Another outstanding advantage of this form of engine is the possibility for conveniently using opposed pistons operating in the same cylinder with a common combustion chamber. This form of construction permits the use of the 2-stroke cycle with piston controlled exhaust and inlet ports at opposite ends of the cylinder. The latter construction eliminates the necessity for a complicated valve gear and permits high engine speeds and high power output.

Previously conceived engine designs of this classification have failed to provide a practical means for absorbing the high thrust loads incident upon the crank bearings. One of the objects of this invention is to provide an improved mechanism for transmitting the piston forces into torque forces on the crankshaft.

A further object of this invention is to provide a practical mechanism for absorbing the torque reacting forces incident upon the intermediary member between the crankshaft and connecting rods.

Another object is to provide a resilient means for insulating the engine frame from the vibratory forces caused by the torque-reaction forces resulting from the power impulses. In engines of high output and in engines having high maximum cylinder pressures, particularly in aircraft engines and compression-ignition engines, the shock loading incident upon the crankshaft and crankshaft gearing is very severe and may cause torsional vibration and subsequent failure of these parts. This invention provides a means for smoothing out these shock forces and should eliminate the necessity for resilient engine mounts and flexible couplings between the engine crankshaft and the various driven shafts.

A further object of this invention is to provide a simple and practical mechanism for varying the compression ratio of all cylinders simultaneously and automatically while in operation. To those familiar with the art it is well known that tremendous advantages lie in having a low compression ratio when maximum power is desired and in having a higher compression ratio when less power but maximum efficiency is desired. For example, with a fuel having a given knock value it is possible to almost double the power by boosting the inlet pressure to the maximum allowable, as limited by fuel knocking, by changing from a compression ratio of 8 to one of 5. Thus, for an airplane take-off where maximum power is of utmost importance a low compression ratio can be employed. For cruising, only about one-half the power is required and a higher compression ratio may be employed with a correspondingly better efficiency.

This invention comprises a compact arrangement of cylinders substantially parallel to a shaft having Z or skew cranks. By means of these cranks the reciprocating movement of the pistons is transformed into a rotary movement of the shaft. The features of the invention may be applied to engines operating on any conventional cycle, and for this reason details of the cylinders, ignition, intake and exhaust and the cooling system have been omitted for simplicity as having no bearing on the invention.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 2 is a fragmentary transverse sectional view through the torque absorbing device taken on line 2—2 of Fig. 1;

Fig. 3 is an enlarged fragmentary longitudinal sectional view of an alternative construction for changing the compression ratio of the engine;

Figs. 4 and 5 are elevational views at right angles to each other of one of the telescopic tubular members;

Fig. 6 is an end elevational view of the structure shown in Fig. 5, as viewed from the right;

Fig. 7 is a plan view of one of the gimbals;

Fig. 8 is an end elevational view of the gimbal shown in Fig. 7;

Fig. 9 is a transverse sectional view taken on line 9—9 of Fig. 8;

Fig. 10 is a fragmentary inside face view of one of the wobblers; and

Fig. 11 is a longitudinal sectional view taken on line 11—11 of Fig. 10.

Figure 1:
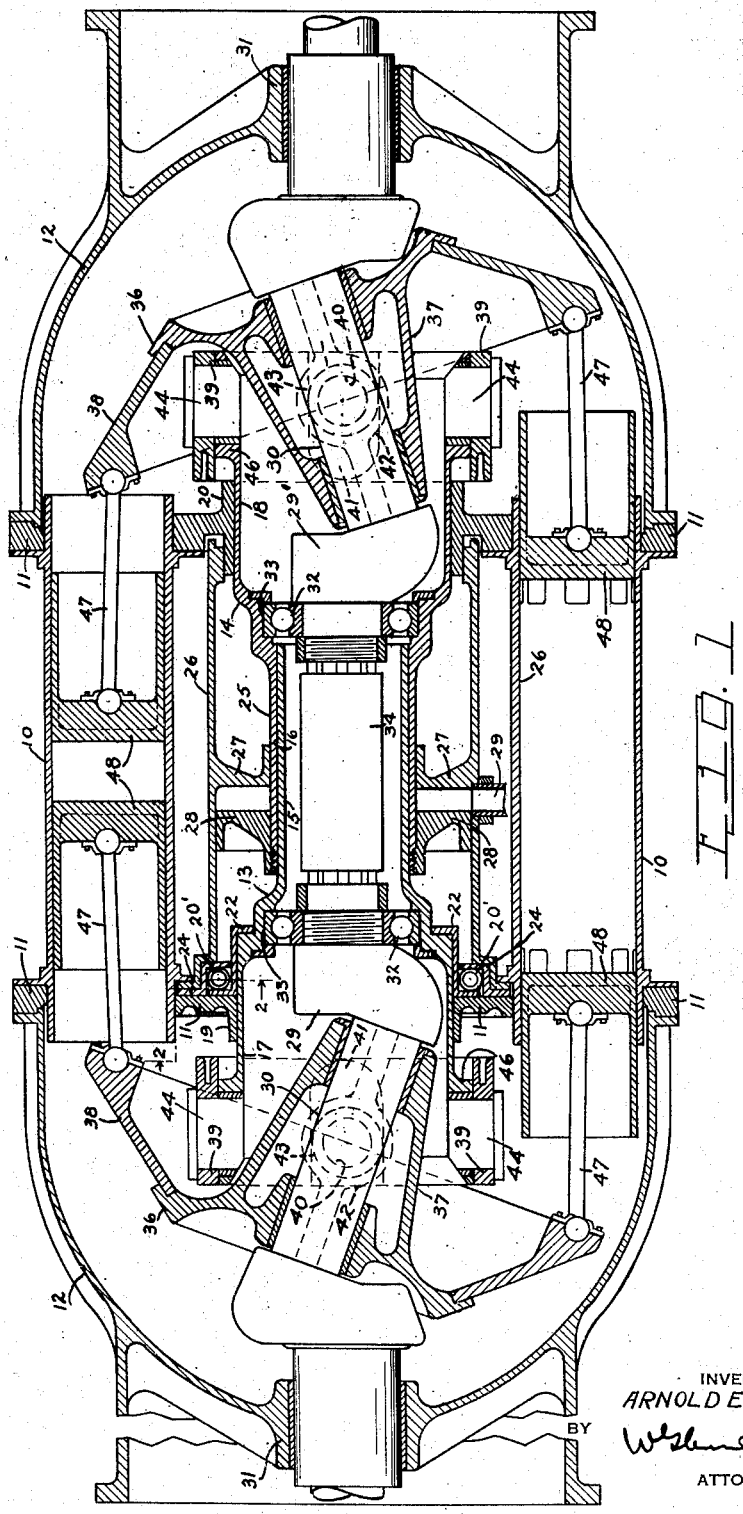
Fig. 1 is a longitudinal sectional view through an internal combustion engine embodying the invention.

Referring to the drawings, an engine constructed in accordance with the invention is shown as comprising a plurality of cylinders 10 arranged in spaced parallel relation about a longitudinal axis. The ends of each of the cylinders 10 are open and extend through and are fixed in end walls 11 of longitudinally spaced end bells 12 of the engine frame. Extending longitudinally through the engine and coaxially therewith is a pair of tubular members 13 and 14 having reduced telescopic inner ends 15 and 16 and enlarged outer ends 17 and 18 mounted in bearings 19 and 20 formed in the end walls 11 of the end bells 12. The tubular member 13 is fixed against axial movement in the bearing 19 and is yieldably held against rotation therein to any great extent by coil springs 20' arranged circumferentially around the enlarged portion 17 thereof between abutments 21 formed on a retainer 22 fixed to the enlargement 17 and abutments 23 on a retainer 24 (Fig. 2), fixed to the wall 11 of the adjacent end bell 12. The tubular member 14, however, is slidable axially in the bearing 20 and its reduced portion 16 is splined to the corresponding portion 15 of the member 13, as indicated at 25, Fig. 3, so as to prevent its rotation. A cylinder 26 surrounds the tubular members 15 and 16 being secured at its ends to the end walls 11 of the bells 12 and is provided with a fixed piston 27 intermediate its ends for cooperation with a piston 28 secured to the end of the reduced portion 16 of the longitudinally movable tubular member 14. Fluid under pressure is forced into the space between the pistons 27 and 28 through a pipe 29 leading to a pump or other source of supply.

A two part crankshaft 29' provided with skew or Z-shaped crank portions 30 extends coaxially through the engine and is journalled at its ends in bearings 31 formed in the end bells 12 and intermediate its ends in bearings 32 mounted in seats 33 formed in the tubular members 15 and 16. The two parts of the crankshaft are keyed together at their inner ends for rotation in unison but for a limited amount of axial sliding movement relative to one another, by means of a sleeve 34 having internal splines engageable with corresponding splines 35 on the crankshaft, Fig. 3. Wobblers 36 having bearings 37 and conical skirt portions 38 are journalled on the crank portions 30. The bearings 37 are pivotally connected at diametrically opposed points with gimbals 39 by studs 40 which pass through slots 41 formed in the enlarged ends 17 and 18 of the tubular members 15 and 16 (Fig. 5) for removable engagement with bearings 42 and 43 formed on the bearings 37 and gimbals 39 respectively. The gimbals 39 are, in turn, pivotally connected at diametrically opposed points with the enlarged ends 17 and 18 for turning movement about axes extending at right angles to the axes of the studs 40, by means of studs 44 engageable with openings 45 in the gimbals 39 and bearings 46 formed on the tubular members 15 and 16. The outer circumference of the skirt portions 38 of the wobblers 36 are pivotally connected by piston rods 47 with opposed pistons 48 in the cylinders 10.

In operation, the explosive mixture is ignited in each of the cylinders 10 in succession at a time in the cycle when the opposed pistons 48 of each cylinder are at their innermost points in their paths of travel, as shown at the upper part of Fig. 1. This will tilt the wobblers outwardly and impart rotary motion to the skew cranks 30. The torque reaction which is approximately opposite and equal to the turning movement on the skew cranks 30 is transmitted from the wobblers 36 to the gimbals 39 and thence to the tubular members 15 and 16, and finally through the springs 20' to the end bells 12 of the engine frame.

The compression ratio may be changed during operation by increasing or decreasing the stroke of the right hand pistons 48, as viewed in Fig. 1, by forcing more or less oil into the space between the pistons 27 and 28 on the cylinder 26 and tubular member 16. This will shift the position of the tubular member 16, right hand gimbal 39, and wobbler carried thereby, axially. It will be noted that the right hand portions of the crankshaft 29 will slide in its bearing 31 when the associated wobbler 36 is moved, connection being maintained with the left hand portion through the sleeve 34. An alternate arrangement for varying the compression ratio according to the average of the gas pressures of the cylinders, can be obtained by inserting coil springs 49 between the pistons 27 and 28, as shown in Fig. 3.

It will be understood that the above description and accompanying drawings comprehend only the general and preferred embodiment of the invention, and that various changes in construction, proportion and arrangement of the parts may be made within the scope of the appended claims without sacrificing any of the advantages of the invention.

The invention described herein may be manufactured and/or used by or for the Government of the United States of America for governmental purposes without the payment of any royalties thereon or therefor.

I claim:

1. An engine having a power shaft provided with skew cranks, cylinders disposed parallel to said power shaft, two opposed pistons reciprocating in each of said cylinders, wobble members carried by said skew cranks, means for connecting said pistons with said wobble members, tubular members concentrically mounted with respect to said shaft, a frame for carrying said cylinders and said tubular members, and gimbal rings pivoted to said wobble members and said tubular members for universally supporting said wobble members concentrically with respect to said shaft, said tubular members being restrained from appreciable rotation about said shaft by means of resilient members between said tubular members and said frame.

2. An engine having its cylinders parallel to its power shaft, skew cranks in combination with said power shaft, two opposed pistons reciprocating in each of said cylinders, wobble members carried by said skew cranks, means for connecting said pistons with said wobble members, tubular members concentrically mounted with respect to said shaft, a frame for carrying said cylinders and said tubular members, gimbal rings pivoted to said wobble members and to said tubular members for universally supporting said wobble members concentrically with respect to said shaft, a control cylinder concentric with respect to said tubular members, pistons fixed to said tubular members for reciprocating in said control cylinder, and means for supplying a fluid to the volume formed between said pistons of said tubular members to move said tubular members parallel to said cylinders to adjustably change the position of travel of said pistons in said cylinders.

3. In a mechanism for converting reciprocating motion parallel to a drive shaft into rotary motion of the drive shaft, a shaft with skew cranks, cross-head guides disposed circumferentially about said shaft, cross-heads reciprocating in said cross-head guides, wobble members carried by said skew cranks, means for connecting said wobble members and said cross-heads, and resilient means for restraining said wobble members against appreciable rotation around said shaft.

4. In a mechanism for converting reciprocating motion parallel to a drive shaft into rotary motion of the drive shaft, a shaft with skew cranks, cross-head guides disposed circumferentially about said shaft, cross-heads reciprocating in said cross-head guides, wobble members carried by said skew cranks, means for connecting said wobble members and said cross-heads, a frame for carrying said cross-head guides and said shaft, gimbal rings pivoted to said wobble members, and resiliently mounted pivots for supporting said gimbal rings on said frame to universally support said wobble members concentrically with respect to said shaft and to wobble about a point coinciding with the intersection of the axes of said shaft and said skew cranks.

5. In a mechanism for converting reciprocating motion parallel to a drive shaft into rotary motion of the drive shaft, a shaft with skew cranks, cross-head guides disposed circumferentially about said shaft, cross-heads reciprocating in said cross-head guides, wobble members carried by said skew cranks, means for connecting said wobble members and said cross-heads, a tubular member concentrically mounted with respect to said shaft, a frame for carrying said cross-head guides, said shaft and said tubular member, gimbal rings pivoted to said wobble members, and resilient means for pivoting said gimbal rings to said tubular member for universally supporting said wobble members concentrically with respect to said shaft and to wobble about points coinciding with the intersection of the axes of said shafts and said skew cranks.

6. In a mechanism for converting reciprocating motion parallel to a drive shaft into rotary motion of the drive shaft, a shaft with skew cranks, cross-head guides disposed circumferentially about said shaft, cross-heads reciprocating in said cross-head guides, wobble members carried by said skew cranks, means for connecting said wobble members and said cross-heads, a tubular member concentrically mounted with respect to said shaft, a frame for carrying said cross-head guides, said shaft and said tubular member, gimbal rings pivoted to said wobble members, means for pivoting said gimbal rings to said tube for universally supporting said wobble members concentrically with respect to said shaft and to wobble about points coinciding with the intersection of the axes of said shaft and said skew cranks, and resilient means secured to said frame and said tubular member for flexibly absorbing torque forces incident on said tube.

7. In a mechanism for converting reciprocating motion parallel to a drive shaft into rotary motion of the drive shaft, a shaft with skew cranks, cross-head guides disposed circumferentially about said shaft, cross-heads reciprocating in said cross-guides, wobble members carried by said skew cranks, means for connecting said wobble members and said cross-heads, tubular members concentrically mounted with respect to said shaft, a frame for carrying said cross-head guides, said shaft and said tubular members, resilient means for preventing appreciable rotation of said tubular members with respect to said frame, gimbal rings pivoted to said wobble members, means for pivoting said gimbal rings to said tubular members for universally supporting said wobble members concentrically with respect to said shaft and to wobble about points coinciding with the intersection of the axes of said shaft and said skew cranks, and means for adjustably moving one of said tubular members in a direction parallel to the axes of said cross-head guides.

8. An engine having a shaft with a skew crank, cylinders disposed circumferentially around said shaft, pistons reciprocating in said cylinders, a flanged cylindrical member mounted on said skew crank shaft, said flanged cylindrical member having trunnion journals at right angles to its axis, a tubular member concentrically mounted with respect to said shaft, said tubular member having trunnion journals at right angles to said shaft, a frame for supporting said cylinders, said shaft and said tubular member, a wobble member mounted on said flanged cylindrical member, connecting members between said pistons and said wobble member, and a gimbal ring mounted in the journals of said tubular member and said flanged cylindrical member for universally supporting said wobble member about the center of said skew crank.

9. A mechanism having a shaft with a skew crank, cross-head guides disposed circumferentially around said shaft, cross-heads reciprocating in said cross-head guides, a flanged cylindrical member mounted on said skew crank shaft, said flanged cylindrical member having trunnion journals at right angles to its axis, a tubular member concentrically mounted with respect to said shaft, said tubular member having trunnion journals at right angles to said shaft, a frame for supporting said cross-head guides, said shaft and said tubular member, a wobble member mounted on said flanged cylindrical member, connecting members between said cross-heads and said wobble member, and a gimbal ring mounted in the journals of said tubular member and said flanged cylindrical member for universally supporting said wobble member about the center of said skew crank.

10. An engine having a shaft with a skew crank, cylinders disposed circumferentially around said shaft, pistons reciprocating in said cylinders, a flanged cylindrical member mounted on said skew crank shaft, said flanged cylindrical member having trunnion journals at right angles to its axis, a frame for supporting said cylinders and said shaft, a tubular member mounted for rotation in said frame and concentrically mounted with respect to said shaft, said tubular member having trunnion journals at right angles to said shaft, a wobble member mounted on said flanged cylindrical member, connecting members between said pistons and said wobble member, a gimbal ring mounted in the journals of said tubular member and said flanged cylindrical member, and a resilient means for restraining the rotation of said tubular member in said frame.

11. A mechanism having a shaft with a skew crank, cross-head guides disposed circumferentially around said shaft, cross-heads reciprocating in said cross-head guides, a flanged cylindrical member mounted on said skew crank shaft, said flanged cylindrical member having trunnion journals at right angles to its axis, a frame for supporting said cross-head guides and said shaft, a tubular member mounted for rotation in said frame and concentrically mounted with respect to said shaft, said tubular member having trunnion journals at right angles to said shaft, a wobble member mounted on said flanged cylindrical member, connecting members between said cross-heads and said wobble member, a gimbal ring mounted in the journals of said tubular member and said flanged cylindrical member, and a resilient means for restraining the rotation of said tubular member in said frame.

ARNOLD E. BIERMANN.